W. M. NORRIS.
LOG WAGON.
APPLICATION FILED JUNE 10, 1909.
940,547.
Patented Nov. 16, 1909.
2 SHEETS—SHEET 1.
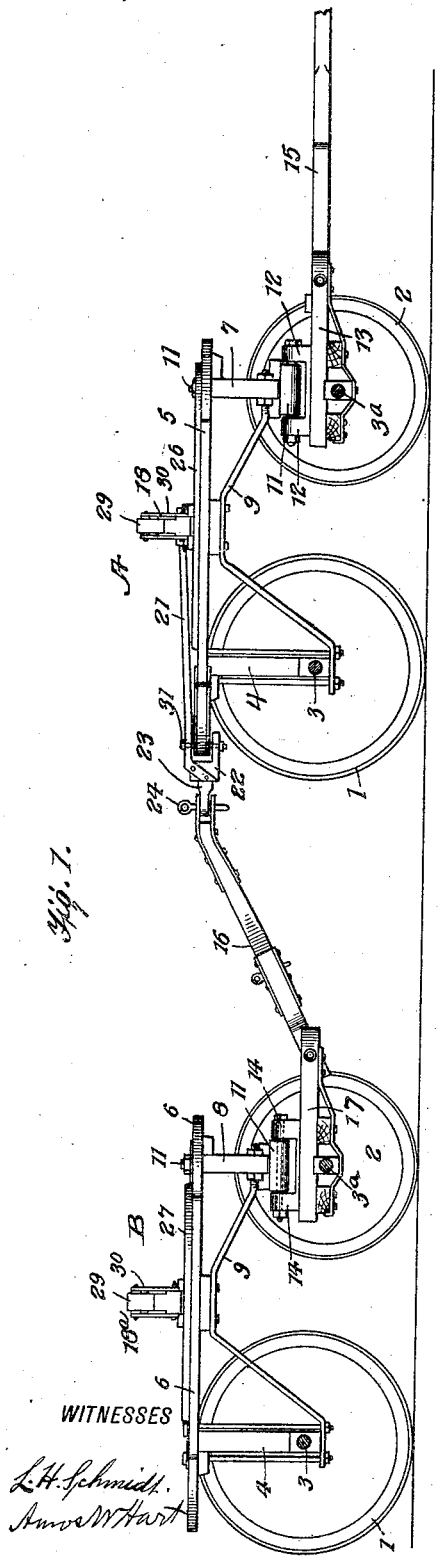
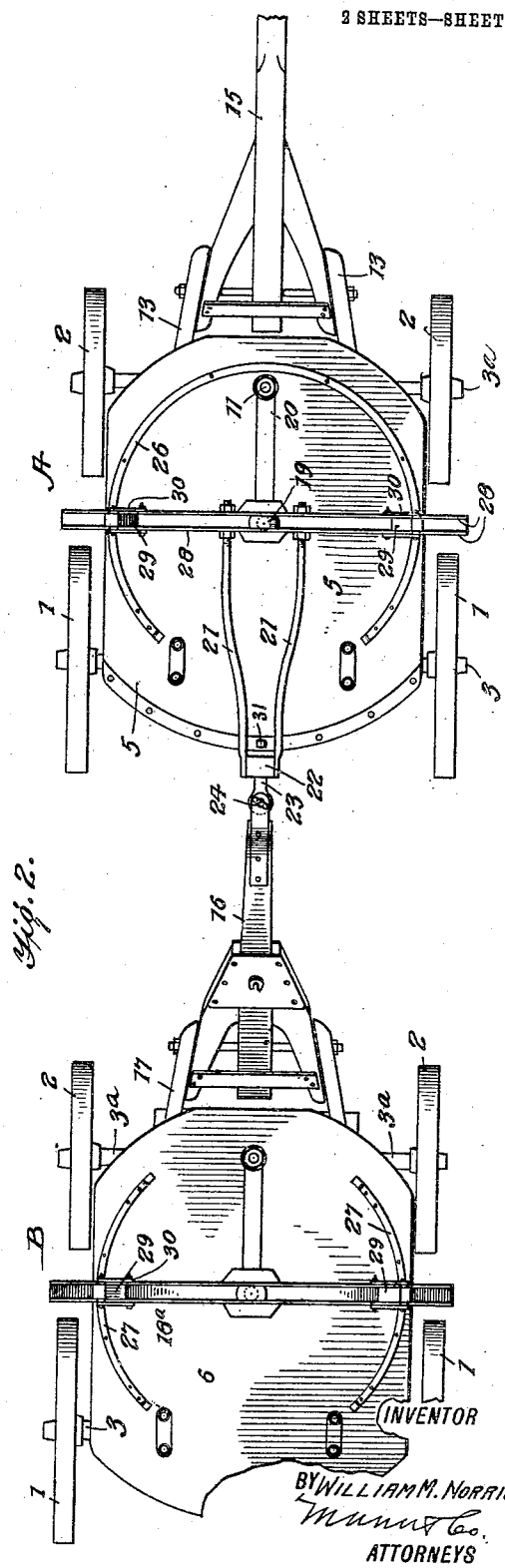
WITNESSES
L. H. Schmidt.
Amos W. Hart.
INVENTOR
BY WILLIAM M. NORRIS,
Munn & Co.
ATTORNEYS

W. M. NORRIS.
LOG WAGON.
APPLICATION FILED JUNE 10, 1909.

940,547.

Patented Nov. 16, 1909.
2 SHEETS—SHEET 2.

WITNESSES
L. H. Schmidt
Amos W Hart

INVENTOR
WILLIAM M. NORRIS,
BY Munn & Co.
ATTORNEYS

UNITED STATES PATENT OFFICE.

WILLIAM MILTON NORRIS, OF EDWARDS, MISSISSIPPI.

LOG-WAGON.

940,547.

Specification of Letters Patent.  Patented Nov. 16, 1909.

Application filed June 10, 1909. Serial No. 501,307.

*To all whom it may concern:*

Be it known that I, WILLIAM MILTON NORRIS, a citizen of the United States, residing at Edwards, in the county of Hinds, State of Mississippi, have invented an Improvement in Log-Wagons, of which the following is a specification.

Log-wagons require to have great strength and durability, along with maximum lightness and easy draft, besides being adapted to turn in a comparatively small circle. Eight-wheel wagons are preferable, but they have certain objections or defects which I have removed by my improved construction, arrangement, and combination of parts. The same are illustrated in the accompanying drawing, in which—

Figure 3:
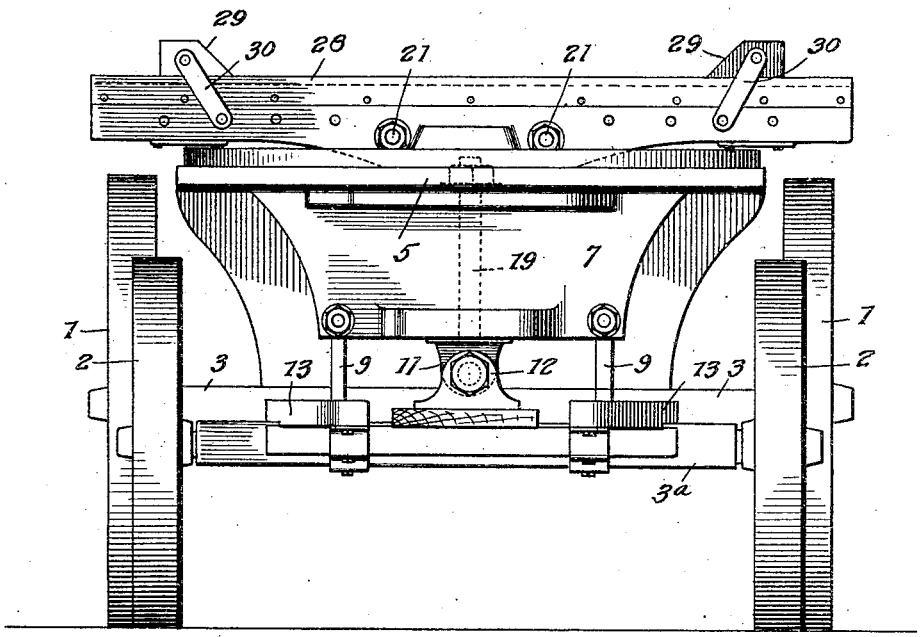
Figure 4:
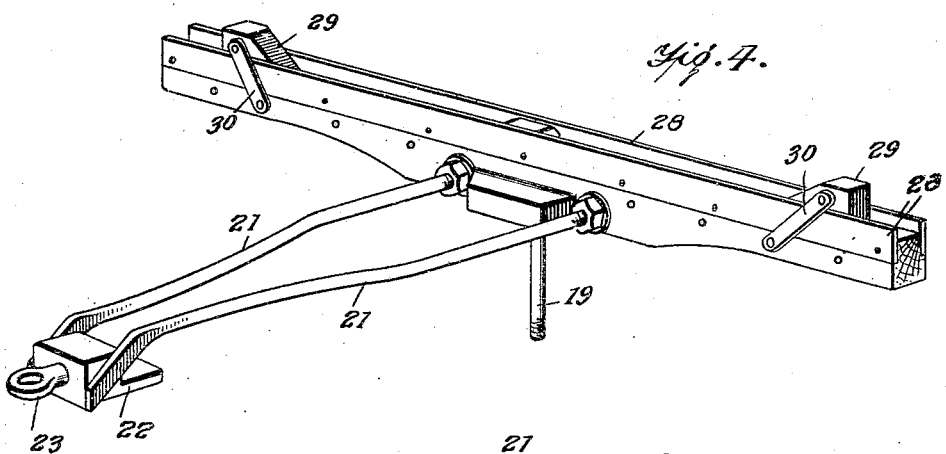
Figure 5:
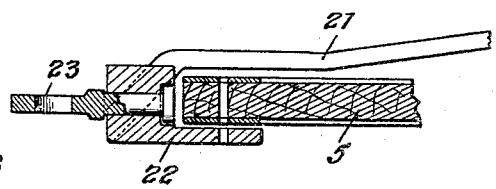

Figure 1 is a side view of my improved log-wagon. Fig. 2 is a plan view of the same. Fig. 3 is a front end view, the pole or tongue being removed. Fig. 4 is a perspective view of the front log beam, or bolster, with a rear attachment hereinafter described. Fig. 5 is a section of a portion of such attachment.

Referring in the first instance to Figs. 1 and 2, A indicates a front truck and B a rear truck, each of which is provided with four wheels, to wit, rear wheels 1 and smaller front wheels 2. The axles 3 of the rear wheels are rigidly connected with rear bolsters 4 and with the respective decks or platforms 5 and 6. The front axles 3ª of the front and rear decks or platforms 5 and 6, are attached to hounds which are in turn connected by a universal joint with the front bolsters 7 and 8, respectively. The two bolsters of each truck are rigidly connected and braced by angular irons 9. The front wheels 2 of each truck are made of such diameter that they are adapted to turn under these combined braces and reaches, so that the wagon may turn in a comparatively small circle. The front axles 3ª of the respective trucks A and B, are connected with the front bolsters 7 and 8 by a rocking king-bolt 11, the same having a T-shape, as shown in Fig. 1, and the head of the same being pivoted in lugs 12 of a plate that is secured upon the hounds 13 of the respective axles. A pivot bolt 14 passes through such lugs and the head of the king-bolt, so that the front truck is adapted to rock vertically and at the same time turn to the right or left. In brief, the connection formed by these means, between the front bolster and each forward axle, is practically a swivel that allows the front wheels and axle to turn or oscillate vertically. A tongue 15 is pivoted in the ordinary way to the hounds 13 of the front truck A, and a short tongue 16 is similarly pivoted between the hounds 17 of the rear truck.

An improved feature of my invention is the connection of the rear truck with the front one, and this is effected by the following means. A log beam or bolster 18 is pivoted centrally to the front deck or platform 5 by means of a bolt 19, see Fig. 4, and a metal strap 20 extends back from king-bolt 11, and is connected with the pivot bolt 19 of said bolster in such manner as to support it and take part of the strain due to draft. Two iron rods 21, extend rearward from the log bolster 18 and are attached to a block 22 having a forward projection as shown in Fig. 1, which lies under the rear edge of the deck or platform 5. An eye-bolt 23, see Figs. 4 and 5, is pivoted in the block 22, and the tongue 16 of the rear truck B is detachably connected with it by means of a removable pin 24. Thus there is a direct draft connection between the rear truck B and the front truck A, through the medium of the rear tongue 16, the swivel connection, the draft rods 21, and the front bolster 18. The rear edge of the front platform 5 is curved upon the arc of a circle described from the pivot 19 of the log-bolster 18, and it will be seen that the block 22 is adapted to slide or move laterally, more or less, over such arc, when the front truck is turned to the right or left; and further, that the connection between the two trucks is in effect a swivel which permits any movement of one truck relative to the other, so far as relates to turning or oscillating. The front log beam or bolster 18 is supported upon an iron circle bar 26, and the rear bolster 18ª is similarly supported and adapted to turn on curved bars 27. Each bolster is formed of a wooden bar of the requisite size and strength, and two metal strips or bars 28, the latter being arranged parallel and projecting above the wooden bar, as shown in Fig. 4. The log rests directly on these strips 28, which bite into it and thus prevent it slipping lengthwise, while chocks 29, having inclined inner faces, are employed for supporting the log on either side, so as to prevent lateral movement. The chocks are adapted to slide between the strips 28, which thus form a guide-way for the same, and they are held in any position to which they may be adjusted, by means of links 30 that are pivoted to the wooden bar forming the body or main portion of the bolster.

It is apparent that, in turning the front truck A relative to the rear one B, the bolsters 18 and 18ª remain parallel to each other with a log supported thereon, which holds them the same distance apart and is prevented from sliding back and forth on the bolsters. In other wagons of this type, which are coupled in the center between the sills, the log tends to slide as the trucks turn, which causes the bolsters to lean if not to break.

My improved wagon may be turned around within a very narrow circle, since the front wheels of both trucks are adapted to turn under the respective decks or platforms. In going down hill, a locking pin 31, see Fig. 1, should be inserted through the rear edge of the front platform 5 and through the projecting lip of the block 22. In fact this pin should always be left in such position when no log is on the wagon.

What I claim is:

1. The improved log-wagon comprising front and rear trucks having each a platform and four wheels, and arched reaches and braces connecting the platform with the bolsters, the front wheels being of such diameter that they are adapted to turn under the reaches, a swivel connection between the front axle and platform of each truck, and a swivel connection between the two trucks, substantially as shown and described.

2. In a log-wagon of the type indicated, the combination of the two four-wheel trucks and a draft attachment connecting the two and consisting of a log bolster pivoted to the front truck, a rearward extension thereof having a swivel bolt, and a tongue pivoted to the rear truck and connected with said swivel bolt, substantially as described.

WILLIAM MILTON NORRIS.

Witnesses:
C. J. HUME,
M. C. HENINGTON.